Sept. 17, 1940.    D. B. BAKER ET AL    2,214,806
MOUNTING FOR VEHICLE CONTROL MEANS
Filed June 25, 1938    3 Sheets-Sheet 1

Inventors
David B. Baker
Clifford R. Rogers
William O. Bechman
By V. F. Lasagne
Atty

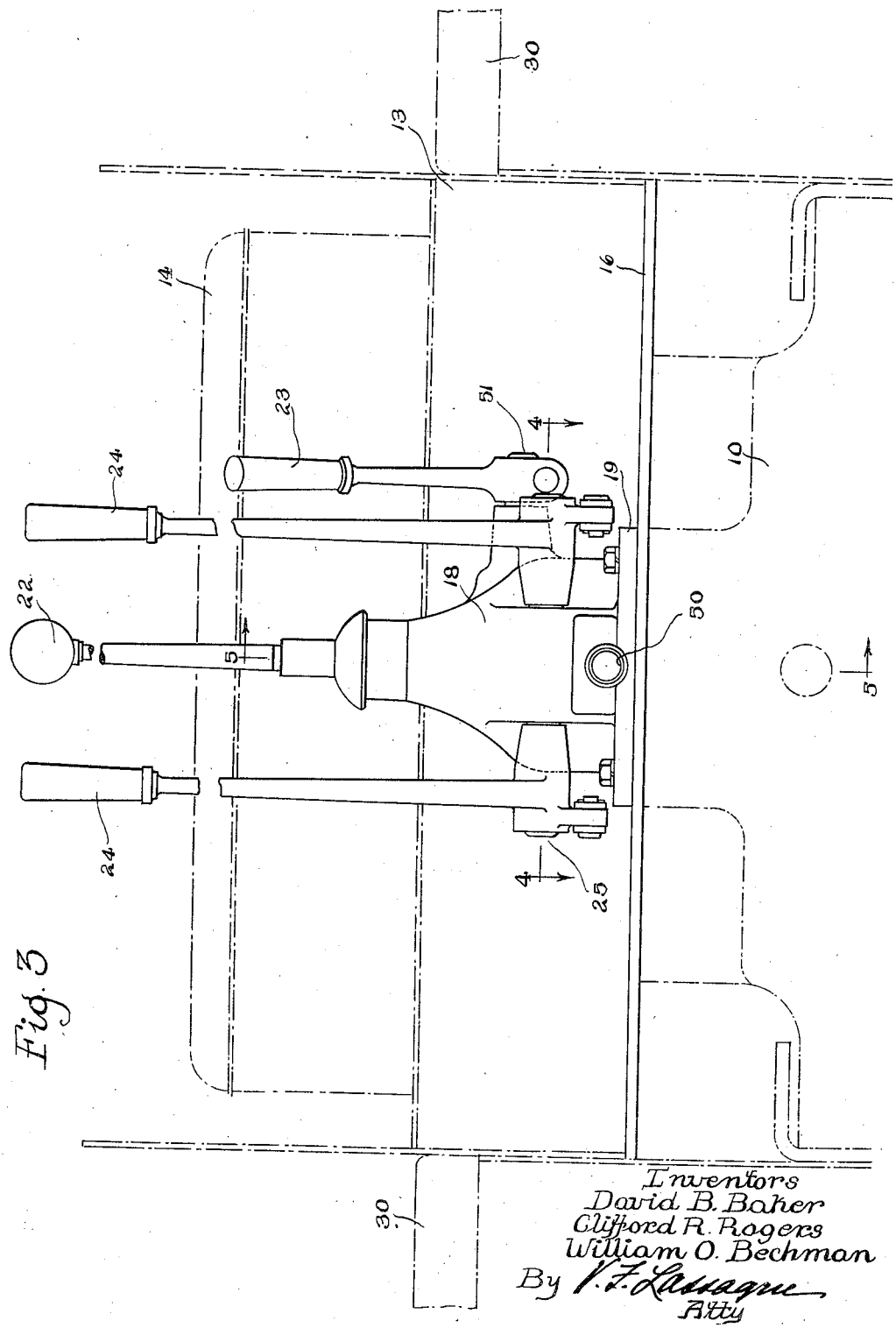

Sept. 17, 1940.    D. B. BAKER ET AL    2,214,806
MOUNTING FOR VEHICLE CONTROL MEANS
Filed June 25, 1938    3 Sheets-Sheet 3
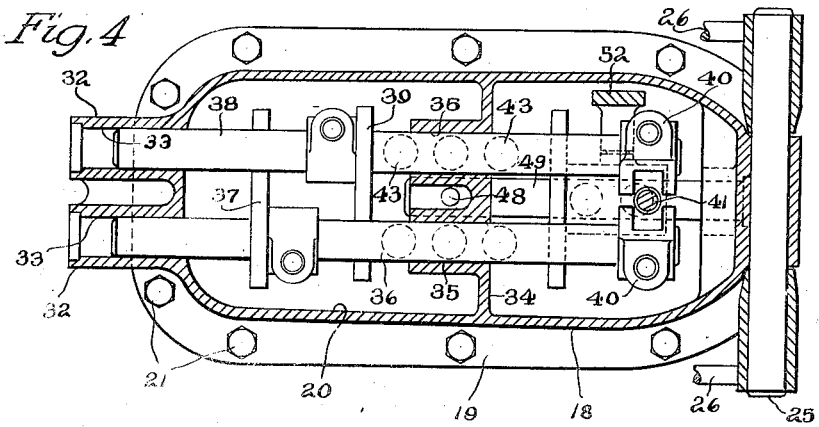
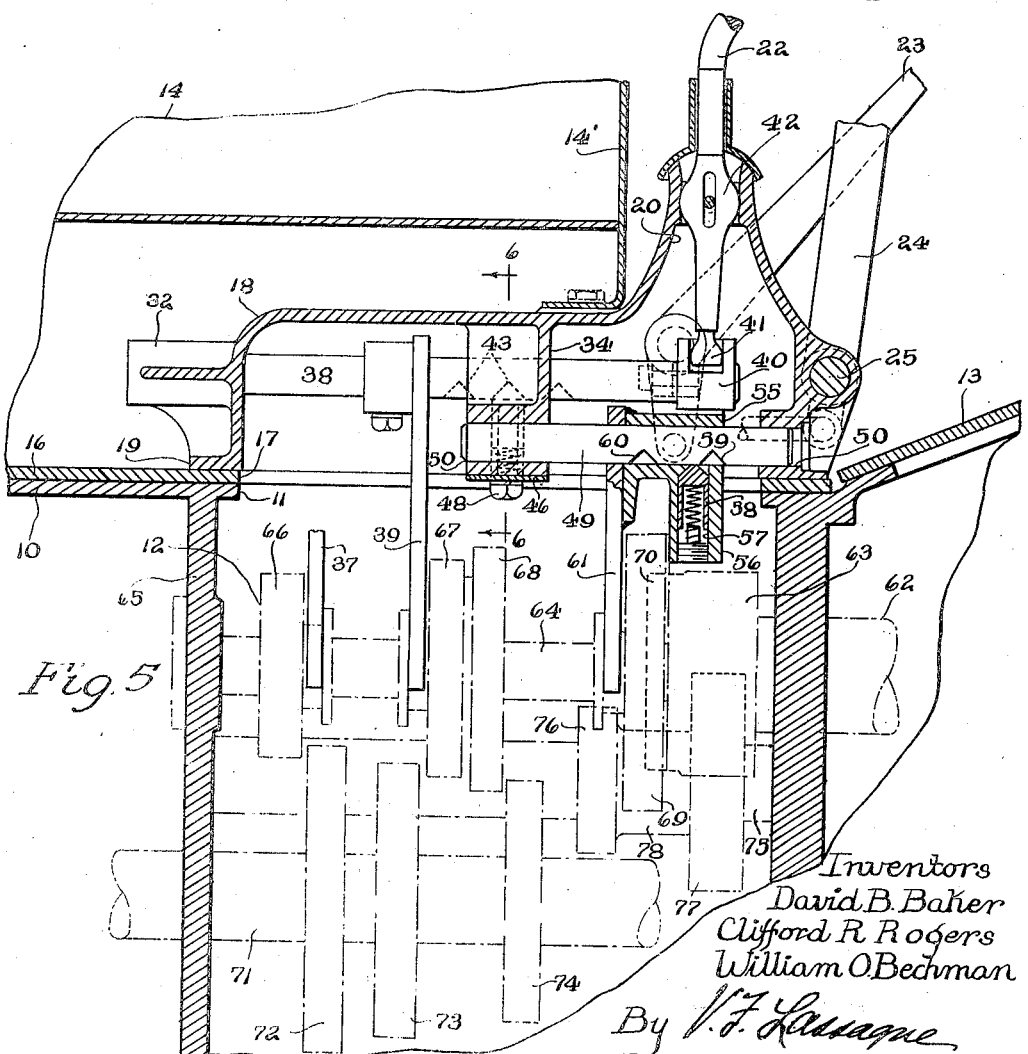
Inventors
David B. Baker
Clifford R. Rogers
William O. Bechman
By V. F. Lassagne
Atty Patented Sept. 17, 1940

2,214,806

UNITED STATES PATENT OFFICE 2,214,806

MOUNTING FOR VEHICLE CONTROL MEANS

David B. Baker, Riverside, Clifford R. Rogers, Oak Park, and William O. Bechman, Chicago, Ill., assignors to International Harvester Company, a corporation of New Jersey Application June 25, 1938, Serial No. 215,916

2 Claims. (Cl. 180—9.2)

This invention relates to control means for the operating mechanisms of a vehicle and more particularly to a means for mounting the control means in a unitary relationship.

While the invention contemplates the provision of the present mounting means for vehicles of any type, it is in the adaptation of the means to a tractor of the track-laying type wherein the invention proves highly desirable, and the present disclosure, therefore, will have reference especially to such a vehicle.

In tractors of the track-laying type, a main body structure is carried on a pair of self-laying tracks. The driving mechanism for these tracks includes the usual power plant connected by a master clutch to a change-speed gear-set or transmission, which, in turn, is connected to the final drive mechanism for the tracks. Interposed in the final drive mechanism are two steering mechanisms, one for each track. As is well known to those skilled in the art, these steering mechanisms comprise clutches which are adapted to be controlled separately for driving the respective tracks, and numerous types of control and interconnecting means therefor have been utilized. Similarly, various types of control means have been provided for operating the change-speed gear-set. In ordinary constructions, a tractor of the type referred to is provided with an operator's deck, which includes a substantially flat floor structure and an operator's station or seat. It is important, of course, that the controls for the steering mechanisms and the gear-set be located within easy reach of the operator on the seat. Since the various elements of the driving mechanisms are contained within the body of the tractor, and the operator's deck is carried above the body, it is necessary that the controls extend upwardly from the body in close proximity to the operator's station. To accommodate this peculiarity of construction, vehicles, and especially tractors of the track-laying type, have heretofore been provided with operator decks, the floor structures of which were formed with numerous openings, through which these controls extended. Since the floor structure oftentimes served to enclose the upper portion of the body, it was found that these various openings permitted the entrance of considerable dust, and the like, to the driving mechanisms. To provide for movement of the controls, these openings were consequently quite large and a difficult problem was thereby encountered. This type of construction offered further difficulty when it became necessary to remove either or both the controls or portions of the operator's deck, since these parts were necessarily so interrelated as to prevent removal of one without consequent disturbance of the other.

The principal object of the present invention, then, is to provide a means for mounting the controls in a manner in which the above mentioned difficulties and disadvantages, together with others, are eliminated.

An important object is to group in substantially one place the controls for the steering mechanisms and the control for the change-speed gear-set.

Another important object, when the tractor embodies a multi-ratio change-speed gear-set, is to include in the mounting means a control for effecting ratio changes in the change-speed gear-set.

Another object of the invention is to provide a unitary housing structure serving to enclose a portion of the tractor body and to support a plurality of control levers.

Another object is to locate the housing above the floor structure of the operator's deck to eliminate unnecessary openings therein.

Still another object is to secure the housing to the body in a manner serving also to secure a portion of the floor structure to the body.

Still another object is to provide a substantially hollow housing or cover structure which carries means for engaging change-speed gears in the gear-set and within which the change-speed control lever is connected to said shifting means.

And, still another object is to provide a cover structure which is associated with the operator's deck and the body in a manner permitting easy assembly and removal of the associated parts.

Briefly and specifically, these and other desirable objects of the invention are provided in a preferred construction in which the tractor includes a body having a substantially flat, open top. An operator's deck is carried above the body and includes a floor structure secured to the flat top of the body. The floor is provided with an opening substantially coincident with the opening in the body which is in alinement with the change-speed gear-set. A substantially hollow housing or cover structure is secured over and encloses these openings. This housing serves also to carry a plurality of control levers, at least one of which is operatively connected to the change-speed gear in the gear-set for shifting the same. In the present disclosure of the invention, the change-speed gear-set is of the multi-ratio type and a second control lever is provided for effecting ratio changes. The housing or cover structure further carries a pair of control levers which are operatively associated respectively with the steering mechanisms for the respective self-laying tracks.

A more complete understanding of the above enumerated and other objects of the invention may be had from the following detailed description taken in conjunction with the accompanying sheets of drawings, in which:

Figure 3 is an enlarged front elevational view of the improved mounting means for the control levers, showing related portions of the tractor diagrammatically;

Figure 4 is a horizontal sectional view taken substantially on the line 4—4 of Figure 3, showing also the shifting means for operating the change-speed gears in the gear-set;

Figure 5 is a vertical sectional view taken substantially on the line 5—5 of Figure 3, showing the disposition of the cover and the various controls as related to one type of change-speed gear-set; and, Figure 6 is a vertical sectional view taken on the line 6—6 of Figure 5, showing in detail the manner in which the shifting means are supported by the cover structure.

Figure 1:
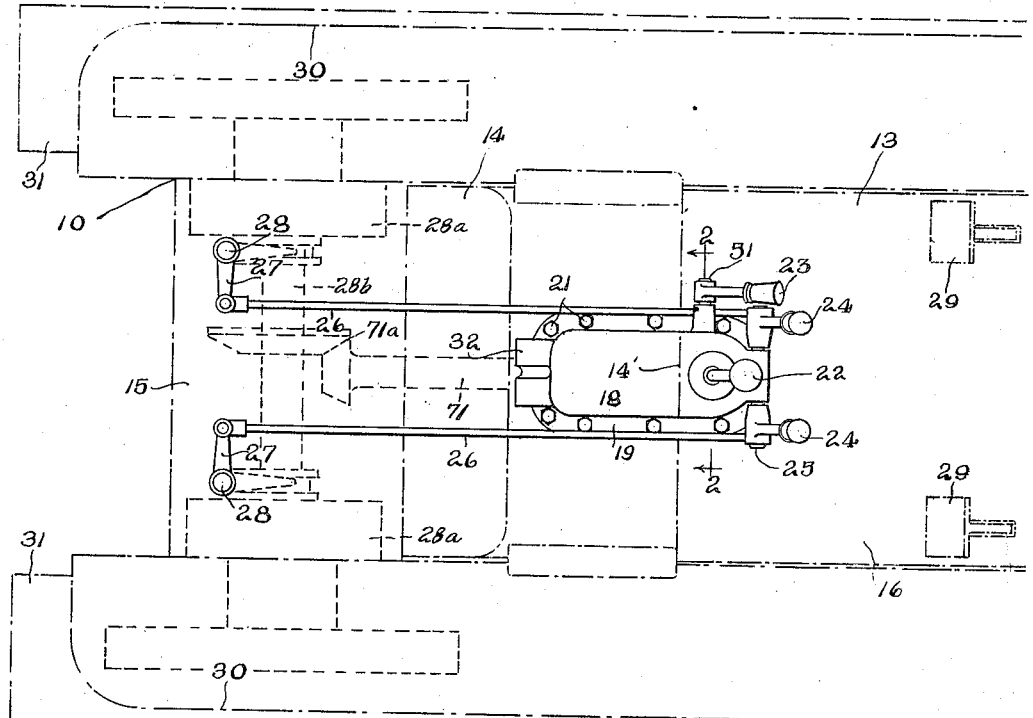
Figure 1 is a plan view of the rear portion of a tractor of the track-laying type, showing a preferred embodiment of the invention and its relation to other parts of the tractor.

The present type of tractor selected for the purpose of illustrating the present invention includes a body 10, best shown in Figures 3 and 5. This body is formed with a substantially flat top and is open, as at 11, in the vicinity of a change-speed gear-set or transmission 12. This change-speed gear-set may be of any type, and the one herein illustrated and described is of the type including three speeds forward and one reverse, further including multi-ratio gearing for operating the transmission in either of two ratios. The detailed operation of the transmission will be described later.

An operator's deck 13 is disposed above the body 10 and comprises an operator's station or seat 14, a fuel tank 15, and a platform or floor structure 16. This floor structure 16 overlies the body 10 and is secured to the upper flat portion thereof. The floor structure is further provided with an opening 17 which is substantially coincident or in vertical alinement with the opening 11 in the body 10.

To provide for mounting control levers for the operating mechanism of the tractor, it is desirable that a means be provided which places the control levers within easy reach of the operator's station and which at the same time eliminates unnecessary openings in the platform or floor 16. This means is accomplished in one preferred form by the provision of a housing or cover structure 18, which is in the form of a casting having a horizontal flange 19 and being formed substantially hollow, as at 20.

Figure 2:
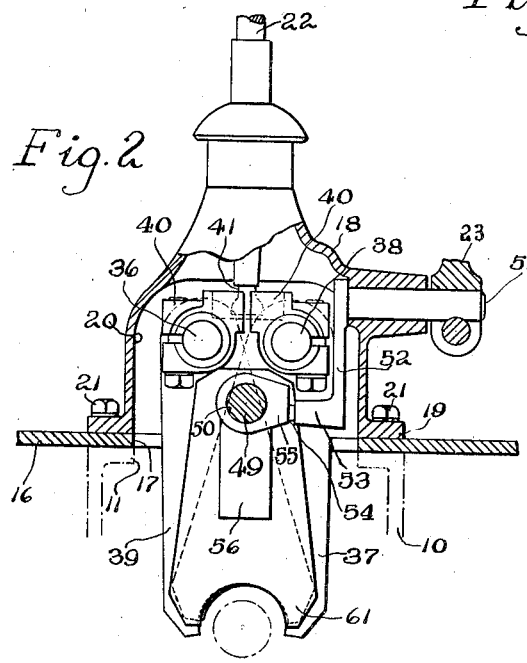
Figure 2 is an enlarged sectional view taken on the line 2—2 of Figure 1, showing the means within the cover structure and the respective connections with the change-speed control levers.

This housing or cover is secured to the floor structure and body by a plurality of bolts 21 passed through the horizontal flange 19. As best illustrated in Figures 2 and 3, the housing or cover 18 is preferably secured to the body 10 with the floor 16 therebetween. From an examination of Figure 5, it will be seen that removal of the housing 18 exposes the change-speed gear-set 12 through the openings 11 and 17 through the body and the floor 10 and 16, respectively.

As best shown in Figures 1 and 3, the housing or cover structure 18 provides means for mounting a plurality of control levers for operating various mechanisms of the tractor. At a forward portion and centrally thereof, the housing 18 carries a gear shifter lever 22, the operation of which is connection with the change-speed gear-set 12 will be described later in conjunction with the operation of the gear-set. The housing 18 at one side further carries a second control lever 23, which is adapted to effect ready changes in the multi-ratio change-speed gear-set. The operation of this lever will also be later described. A second pair of control levers 24 is also carried by the housing 18, being disposed for pivotal movement about a transverse rock-shaft 25. A portion of each control lever 24 extends below the rock-shaft 25 and is connected by a link 26 to an arm 27 rigidly carried by a vertical rock-shaft 28. Each rock-shaft is operatively connected to a respective steering mechanism 28a, shown diagrammatically in Figure 1 as being carried by a transverse shaft assembly 28b. These steering mechanisms and the connections thereto may be of any well known construction and form no part of the present invention, except insofar as they may be operated by the control levers 24, which are carried on the improved mounting means, as heretofore mentioned.

It will be seen from an examination of Figures 1 and 5 that the rearward portion of the housing or cover structure 18 extends longitudinally and rearwardly below the operator's station or seat 14, a forward wall 14' of the seat being disposed transversely across the operator's deck 13 and having its lower portion secured to the housing 18. That part of the housing or cover structure that extends forwardly of the front wall 14' of the seat 14 carries the control levers 22 and 23 and the steering mechanism control levers 24. These control levers are conveniently grouped and are within easy reach of an operator on the seat 14. The provision of the improved mounting means eliminates unnecessary openings and obstructions in the operator's deck 13, and the floor structure 16 is consequently a substantially clear area. A pair of brake pedals 29 extend upwardly through openings in the floor structure at its forward end. These pedals are connected in any well known manner to the brake mechanisms of the tractor, which, as is well understood by those skilled in the art, operate in conjunction with the usual clutches in the steering mechanisms. Thus, it will be seen that a desirable arrangement of control levers has been provided from the standpoints of convenience, appearance and operating efficiency. The operator's deck is delineated at opposite sides by the usual fenders 30, which overlie respective self-laying tracks 31. These tracks 31 are operated in the usual manner by the previously mentioned steering mechanisms through drive sprockets 31a.

Figure 6:
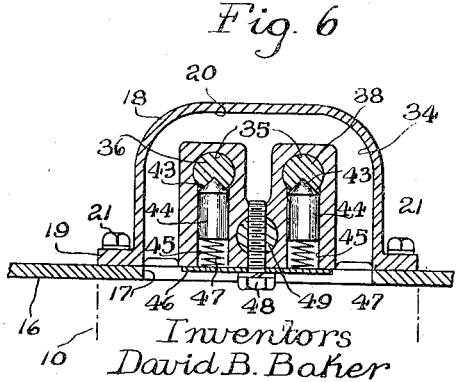

The following description will pertain to the shifting means for shifting the change-speed gears in the gear-set or transmission 12. As best shown in Figures 2, 4 and 5, the housing or cover structure 18 is formed with a hollow portion substantially coincident with the openings 11 and 17 in the body 10 and floor structure 16, respectively. An upper wall or portion of the housing 18 is spaced a substantial distance above the surface of the floor structure, this construction providing for housing the shifting means. At its rearward end, the housing 18 is provided with a pair of longitudinally extending portions 32, each of which is provided with a longitudinally extending bore 33. A middle portion of the housing is provided with a transverse wall or supporting portion 34, as best shown in Figures 4, 5 and 6. This wall is provided with a pair of longitudinally extending bores 35 in alinement with the bores 33 in the rearward portions 32 of the housing. A shifter rod 36 is slidably carried in the alined bores 33 and 35 at the right side of the housing as viewed from the rear of the tractor. At a portion intermediate the portions 32 and 34, the shifter rod 36 rigidly carries, for movement therewith, a conventional type of shifter fork 37. At the left side of the housing 18, a second shifter rod 38 is slidably carried in the bores 33 and 35 at that side. This shifter rod is similar to the shifter rod 36 and also carries a conventional shifter fork 39. Both rods 36 and 38 extend substantially the same distance longitudinally throughout the hollow portion of the housing 18, and each is provided at its forward end with a member 40 rigidly carried thereby. These members 40 may be of conventional design and engage a lower end portion 41 of the gear shifter control lever 22, which extends vertically through the upper portion of the housing 18, being movably mounted in the housing, as at 42. Thus far, it will be seen that either of the shifter rods 36 or 38 may be operated by movement of the control lever 22.

As best shown in Figure 6, the intermediate transverse wall or portion 34 is adapted to contain means for holding the shift rods 36 and 38 in any of their positions. Each shifter rod is provided with a plurality of notches or depressions 43, which are adapted to be engaged by the conical ends of a pair of respective detent means 44 slidably carried in vertical bores 45 in a wider portion of the wall 34. A plate or member 46 is secured to the wall 34 at its bottom and serves to retain coil springs 47 for each detent 44. A cap screw 48 extends vertically through the plate 46 and is threaded into the wall or portion 34, serving at the same time to hold a third shifter rod 49 in longitudinal disposition in the housing 18.

This third shifter rod is part of the shifting means for operating the multi-ratio mechanism in the change-speed gear-set 12. This rod extends longitudinally of the housing centrally thereof and below the shifter rods 36 and 38, and is carried at its forward end in a longitudinal bore 50 provided in a forward portion of the housing 18. Thus it will be seen that this rod is held against longitudinal and rotating movement with respect to the housing.

The means for interconnecting the control lever 23 and the shift means for the multi-ratio mechanism will now be described. The control lever 23 is rigidly carried on a transverse rockshaft 51, as best shown in Figure 2. This rockshaft extends within the hollow portion of the housing 18 and rigidly carries at the inner end thereof a crank arm 52. This arm 52, at its lower end, is provided with a transversely extending portion 53, which is operatively connected, as at 54, to a sleeve member 55 slidably carried on the shifter rod 49. The sleeve member 55 is provided with a vertically extending portion 56 formed with a vertical bore 57, in which is carried a spring pressed detent means 58 having a conical portion at its upper end engageable with either of two notches 59 and 60 provided in the shifter rod 49. The sleeve member 55 rigidly carries a shifter fork 61, preferably welded thereto for slidable movement therewith along the shifter rod 49. Thus far, it will be seen that forward or rearward movement of the control lever 23 will shift the sleeve member 55 and shifter fork 61 longitudinally on the shifter rod 49.

As previously mentioned, the change-speed gear-set or transmission 12, chosen for the purposes of illustration in connection with the invention, is of the multi-ratio type. It will be understood that any type of transmission may be provided and the type herein disclosed is illustrated diagrammatically and will be described generally. This transmission or gear-set is driven by a driven shaft 62, which is connected by the master clutch, not shown, to the usual power plant, also not shown. This shaft 62 carries for rotation therewith a gear 63. A transmission shaft 64 is axially alined with the shaft 62 and is journaled at its rear end in a wall 65 of the body 10 and at its forward end is piloted in the rear end of the driven shaft 62 in any well known manner. The shaft 64 carries slidably thereon and for rotation therewith a first speed gear 66, a second speed gear 67, and a third speed gear 68, the latter two gears being preferably formed on a single hub. The gear 66 is provided with a collar which is engaged by the shift fork 37 carried on the shifter rod 36. The gears 67 and 68 are provided with a collar which is engaged by the shifter fork 39 carried on the shifter rod 38. These gears may be thereby shifted into any one of three positions. The shaft 64 carries slidably thereon and for rotation therewith a fourth gear 69 which is concentrically cut out and provided with internal gear teeth, as at 70. The gear 69 is provided with a collar which is engaged by the shifter fork 61 slidably carried on the shifter rod 49. A third shaft 71 is disposed longitudinally in the body 10 below the transmission shaft 64 and extends rearwardly to drive the shaft assembly 28b through bevel gearing 71a. This shaft carries thereon for rotation therewith three gears 72, 73 and 74. Still another shaft 75 is disposed longitudinally in the body 10 and constitutes parts of the multi-ratio mechanism, heretofore referred to. The remainder of this multi-ratio mechanism includes the gear 63 on the shaft 62, the shiftable gear 69 and the internal gear 70 therein, and a pair of gears 76 and 77 formed from an integral hub 78 rotatably carried on the last named shaft 75.

In the operation of the transmission or change-speed gear-set, the control lever 23 is first moved from its neutral position, as shown, into either a forward or backward position, in which case the transmission is adapted to be operated in either one of two ratios or speed ranges. When the lever 23 is moved rearwardly, the shifter fork 61 is moved forwardly, carrying with it the gear 69. In this position, then, the internal gear 70 engages the teeth at the rear portion of the gear 63 and a direct drive is established between the shaft 62 and the shaft 64. With the gear portions 63 and 70 thus engaged, the control lever 22 may be operated to shift the change-speed gears in any one of three forward speeds or one reverse speed. The reverse speed gearing operates in conjunction with the first speed gear 66, and, since it is more or less conventional, it has not been illustrated and will not be described. It will be readily seen from examination of Figure 5 that operation of the control lever 22 results in a first speed engagement between the gears 66 and 72, or a second speed engagement between the gears 67 and 73, or a third speed engagement between the gears 68 and 74.

These same gear changes may be made after the control lever 23 has been shifted to change the ratio of the entire gear-set. This result is attained by moving the lever 23 forwardly which in turn shifts the shifter fork 61 and gears 69, 70 rearwardly. It will be noted that, during direct drive, the gear 63 on the shaft 62 engages the gear 77 and the two gears 76 and 77, being integrally formed on the hub 78, merely rotate idly. However, when the gear 69 is shifted rearwardly, it meshes with the gear 76 and a lower ratio is thus established between the shaft 62 and the shaft 64, the drive passing through the gear 63 to the gear 77, and from the smaller gear 76 to the gear 69. This change in ratio, of course, increases the power of the transmission and the same forward and reverse speeds, heretofore mentioned and described, may be obtained by operation of the control lever 22.

From the foregoing description of the operation of the change-speed gear-set in conjunction with the control levers 22 and 23, it will be seen that a desirable arrangement of these levers and the shifting means associated therewith has been provided in the improved mounting means. It will be further noted that all the control levers and all the shifting means are carried entirely by the housing 18. This feature is important in the event that inspection or repairs of the change-speed gear-set become necessary. The housing or cover 18 is then easily removable from its position over the change-speed gear-set. This removal is accomplished by disconnecting the operating links 26 from the steering mechanism control levers 24 and then removing the bolts 21 from the flange 19 on the housing 18. Since the entire shifting mechanism is entirely carried by the housing or cover, the same is removed along with the cover and unobstructed access is had to the gear-set. It will be noted that removal of the housing and the control means carried thereby does not in any manner disturb the floor structure 16 or any other parts of the operator's deck, except perhaps the front wall 14' of the seat 14. However, special provisions in the construction of the operator's station could be made, and have not been illustrated and described here, as they form no part of the present invention.

From the detailed description of the invention, it can be readily seen that the previously enumerated objects are attainable in a desirable manner. Numerous other objects and desirable features of the invention will be brought out above to those skilled in the art. It will also be brought out from the above that numerous modifications and alterations may be made in construction and operation without departing from the spirit and scope of the invention, as defined in the appended claims.

What is claimed is:

1. In a tractor of the track-laying type including a body containing steering mechanisms for the respective tracks and a change-speed gear-set, the combination therewith of an operator's deck carried above the body and including a horizontal platform structure, said platform being provided with an opening therein disposed substantially in vertical alinement with the change-speed gear-set, a cover structure associated with the platform and enclosing said opening, securing means cooperating with the cover and the platform for securing both to the body, and a plurality of control levers movably carried entirely by the cover above the platform, said levers being operatively connected respectively to the steering mechanisms and to the change-speed gear-set.

2. A tractor construction comprising a body formed with a central compartment, said body being formed with a top opening coincident with the compartment, and an operator's deck structure carried above the body and including a flat platform secured to the top of the body, said platform having an opening therein coincident with the body opening and compartment, said structure further including an operator's seat carried on and spaced above the platform and overlying the greater rear portion of the aforesaid openings, said structure further including a cover structure removably carried over the openings and extending rearwardly beneath the seat, a plurality of bolts passed through the cover and the platform for securing both to the body, and a plurality of control levers carried by and grouped on the cover and extending vertically closely adjacent the forward portion of the seat.

DAVID B. BAKER.
CLIFFORD R. ROGERS.
WILLIAM O. BECHMAN.